United States Patent
Sakamoto

(10) Patent No.: US 6,816,453 B1
(45) Date of Patent: Nov. 9, 2004

(54) COMMUNICATION SYSTEM USING ORTHOGONAL FREQUENCY DIVISION MULTIPLEXED SIGNAL

(75) Inventor: Tadahiko Sakamoto, Kanagawa (JP)

(73) Assignee: Denon, Ltd., Tokyo (JP)

( * ) Notice: Subject to any disclaimer, the term of this patent is extended or adjusted under 35 U.S.C. 154(b) by 0 days.

(21) Appl. No.: 09/404,750

(22) Filed: Sep. 24, 1999

(30) Foreign Application Priority Data

Oct. 7, 1998 (JP) ............................................. 10-300399

(51) Int. Cl.[7] ............................................... H04J 11/00
(52) U.S. Cl. ....................... 370/210; 370/482; 370/508; 375/146
(58) Field of Search ................................. 370/203, 204, 370/208, 210, 342, 441, 482, 508; 375/146

(56) References Cited

U.S. PATENT DOCUMENTS

| | | | | |
|---|---|---|---|---|
| 5,521,943 A | * | 5/1996 | Dambacher | 370/206 |
| 5,608,764 A | * | 3/1997 | Sugita et al. | 375/344 |
| 5,963,592 A | * | 10/1999 | Kim | 370/210 |

FOREIGN PATENT DOCUMENTS

| | | |
|---|---|---|
| EP | 0771084 A1 | 2/1997 |
| GB | 2261142 A | 5/1993 |
| JP | 03-036448 | 3/1983 |
| JP | 04-131058 | 5/1991 |
| JP | 04-172951 | 1/1994 |
| JP | 05-092807 | 11/1994 |
| JP | 8-97798 | 4/1996 |
| JP | 8-316932 | 11/1996 |
| JP | 10-285135 | 10/1998 |
| JP | 11-98103 | 4/1999 |
| JP | 11-136208 | 5/1999 |
| WO | WO 99/20007 | 4/1999 |

* cited by examiner

*Primary Examiner*—John Pezzlo
*Assistant Examiner*—David Odland
(74) *Attorney, Agent, or Firm*—Dickstein Shapiro Morin & Oshinsky LLP

(57) ABSTRACT

An orthogonal frequency division multiplexed signal generator comprises a data sequence conversion means, a power changing means, an inverse discrete Fourier transform part, and an orthogonal modulation means, and modulates a first data and a second data using modulation systems independent of each other, into an orthogonal frequency division multiplexed signal. The data sequence conversion means arranges the first data to be transmitted, in a predetermined order correspondingly to two or more sub-carriers orthogonal to each other on a frequency axis. The power changing means changes powers of the sub-carriers in accordance with the second data to be transmitted which is independent of the first data. The inverse discrete Fourier transform means generates a time-base waveform by synthesizing the individual sub-carriers. The orthogonal modulation means performs orthogonal modulation on a real axis signal and an imaginary axis signal which are orthogonal to each other to synthesize them.

3 Claims, 11 Drawing Sheets

COMMUNICATION SYSTEM USING ORTHOGONAL FREQUENCY DIVISION MULTIPLEXED SIGNAL

BACKGROUND OF THE INVENTION

1. Field of the Invention

The present invention relates to an apparatus for and method of generating orthogonal frequency division multiplexed signal, a demodulator, and a communication apparatus.

2. Description of the Related Art

Commercializing of the OFDM (Orthogonal Frequency Division Multiplexing) system is promoted as a modulation method of digital communication.

An example of a system to which OFDM is applied is the EUREKA-147 SYSTEM. Generally, this is referred to as DAB (Digital Audio Broadcasting) or the EUREKA-147 DAB system. This EUREKA-147 DAB system was approved by ITU-R (International Telecommunication Union-Radio communication sector) on November 1994 as System-A and becomes an international standard. This standard has been issued as "ETS 300401".

In the EUREKA-147 DAB system, each sub-carrier in the OFDM is subjected to phase modulation. As a phase modulation system, is employed the differential QPSK (Quadrature Phase Shift Keying) system, in which main data is transmitted by phase differences of respective sub-carriers between an OFDM symbol duration and the just preceding OFDM symbol duration.

In the EUREKA-147 DAB system, since data is transmitted by phase differences of respective sub-carriers between OFDM symbols, a demodulation means in a receiver requires phase information that becomes a reference. For this purpose, phase reference symbols are periodically inserted into an OFDM signal being transmitted. Each phase reference symbol is constituted by sub-carriers having predetermined reference phases.

Further, in demodulating operation at receiving, each OFDM symbol duration should be specified in order that each OFDM symbol duration is converted onto a frequency axis to extract sub-carrier components on the frequency axis. To that end, in the EUREKA-147 DAB system, a symbol for coarse synchronization, called a null symbol, is inserted just before a phase reference symbol.

The null symbol is a "null" signal having no sub-carrier for transmitting main data. Usually, on the receiving side, a null symbol duration is specified from change of an envelope of the received signal, in order to decide roughly each OFDM symbol duration.

In the EUREKA-147 DAB system, it is possible to optionally superimpose a TII (Transmitter Identification Information) signal on a null symbol duration to identify a transmitting station. The TII signal is transmitted by transmission of only some predetermined sub-carriers out of the sub-carriers of an OFDM symbol. In that case, a null symbol duration is not a null signal but has a waveform of slight amplitude. However, it is suppressed to relatively small amplitude as compared to the amplitude of other OFDM symbol durations transmitting the phase reference symbol or main data.

Taking an example of the mode 2 of the EUREKA-147 DAB system, arrangement of the sub-carriers on the frequency axis in a null symbol duration will be described in the case that a TII signal is added. In the mode 2 of the EUREKA-147 DAB system, information is transferred by 384 sub-carriers.

FIG. 1 shows an arrangement of the sub-carriers on the frequency axis in a null symbol duration in the case that a TII signal is added. As shown in FIG. 1, a TII signal is constituted by some pairs of adjacent sub-carriers of predetermined frequencies in accordance with an identification code defined for each transmitting station. As compared to other OFDM symbols, the number of the sub-carriers is very small. Accordingly, when observed, it has such a waveform that a signal of relatively small amplitude is superimposed on a null symbol duration.

As described above, when a TII signal is superimposed on a null symbol duration, the null symbol duration is actually not a null signal but has a waveform of slight amplitude. Thus, it is possible that superimposition of a TII signal on a null symbol duration makes detection of the null symbol difficult in a receiver. For example, in a location of bad receiving conditions, it is difficult to discriminate between a null symbol and the other OFDM symbols. Further, depending on receiving conditions, a transmitting station expressed by a TII signal may become difficult to be discriminated.

Such situation is not limited to the transmission of a TII signal, and it is possible that similar difficulty is caused when a null symbol duration is utilized for transmitting other data, in addition to data transmitted by phase modulation.

SUMMARY OF THE INVENTION

An object of the present invention is to provide an apparatus for and method of generating an orthogonal frequency division multiplexed signal, as well as a demodulator and a communication apparatus, in which, in addition to a first data transmitted by phase modulation of sub-carriers, a second data can be transmitted without using a null symbol duration.

A first orthogonal frequency division multiplexed signal generator according to the present invention is for generating a signal that is multiplexed into two or more sub-carriers by OFDM, and comprises:

a data sequence conversion means for arranging first data to be transmitted, in a predetermined order correspondingly to two or more sub-carriers orthogonal to each other on a frequency axis;

a power changing means for changing powers of the sub-carriers in accordance with second data to be transmitted which is independent from the first data;

an inverse discrete Fourier transform means for generating a time-base waveform by synthesizing the two or more sub-carriers changed by the power changing means; and an orthogonal modulation means for performing orthogonal modulation on a real axis signal and an imaginary axis signal which are orthogonal to each other and generated by the inverse discrete Fourier transform means, to synthesize the real axis signal and the imaginary axis signal.

In that case, the power changing means may change the powers of the sub-carriers to one of 2 to the s-th power levels in accordance with s bit values of the second data. The power changing means may change powers of a plurality of sub-carriers in accordance with the same second data. The power changing means may change powers of predetermined sub-carriers out of the two or more sub-carriers. The predetermined sub-carriers may be determined in advance corresponding to a TII signal. Further, the power changing means may change powers of sub-carriers in a plurality of OFDM symbol duration in accordance with the same second data.

A second orthogonal frequency division multiplexed signal generator according to the present invention comprises: a phase modulation means for modulating phases of the sub-carriers in accordance with first data; and an amplitude modulation means for modulating amplitudes of the sub-carriers in accordance with second data.

In that case, the amplitude modulation means may superimpose the same second data a plurality of times on the same OFDM symbol. The amplitude modulation means may perform amplitude modulation by reversing polarities for a pair of sub-carriers with each other.

A third orthogonal frequency division multiplexed signal generator according to the present invention comprises:

a data sequence conversion means for arranging first data to be transmitted, in a predetermined order correspondingly to two or more sub-carriers orthogonal to each other on a frequency axis;

a delay means for delaying the first data for a predetermined time to output as second data;

a power changing means for changing powers of the sub-carriers in accordance with the second data;

an inverse discrete Fourier transform means for generating a time-base waveform by synthesizing the two or more sub-carriers changed by the power changing means; and an orthogonal modulation means for performing orthogonal modulation on a real axis signal and an imaginary axis signal which are orthogonal to each other and generated by the inverse discrete Fourier transform means, to synthesize the real axis signal and the imaginary axis signal.

In that case, when a minimum unit for transmitting the second data is s bits, the power changing means may change a power spectrum of the sub-carriers according to 2 to the s-th power levels. Further, when a minimum unit for transmitting the first data assigned to the sub-carriers is p bits, the power changing means may select the s bits so that s is equal to or more than p, to transmit the second data.

A fourth orthogonal frequency division multiplexed signal generator according to the present invention comprises: a data sequence conversion means for generating complex data corresponding to two or more sub-carriers orthogonal to each other on a frequency axis, based on first data;

a power changing means for changing power of the complex data in accordance with second data;

an inverse discrete Fourier transform means for performing inverse discrete Fourier transform on the complex data changed by the power changing means; and an orthogonal modulation means for performing orthogonal modulation on a real axis signal and an imaginary axis signal which are orthogonal to each other and generated by the inverse discrete Fourier transform means, to synthesize the real axis signal and the imaginary axis signal.

A demodulator according to the present invention is one for demodulating an orthogonal frequency division multiplexed signal. The demodulator comprises:

a quadrature detection means for performing quadrature detection on the multiplexed signal to obtain a first detection axis signal and a second detection axis signal which are quadrate to each other;

a discrete Fourier transform means for sampling respective time-base waveforms of the two detection axis signals at a predetermined sampling frequency, and for performing discrete Fourier transform on these sampled data to obtain two or more metrics distributed in a frequency domain;

a second data extracting means for extracting second data based on powers of the metrics obtained by the discrete Fourier transform means; and a first data extracting means for extracting first data from phase changes of sub-carriers for each symbol, obtained by the discrete Fourier transform means.

The demodulator may further comprise an averaging means for averaging the auxiliary data extracted by the auxiliary data extracting means, for a plurality of OFDM symbol duration.

A method of generating an orthogonal frequency division multiplexed signal according to the present invention is one for generating a signal that is orthogonal-frequency-division-multiplexed into two or more sub-carriers. A first method of generating an orthogonal frequency division multiplexed signal comprises the step of modulating a plurality of data given independently of one another, using different modulation systems.

A second method of generating an orthogonal frequency division multiplexed signal comprises the steps of: generating delayed data from given data by delaying the given data for a predetermined time; and performing independent modulation on the delayed data using a different modulation system from one applied to the given data.

A first storage medium according to the present invention is one storing an orthogonal frequency division multiplexed signal generating program for generating a signal that is orthogonal-frequency-division-multiplexed into two or more sub-carriers. The program comprises the steps of:

arranging first data in a predetermined order correspondingly to two or more sub-carriers orthogonal to each other on a frequency axis;

changing powers of the sub-carriers in accordance with second data given independently of the first data; and performing inverse discrete Fourier transform on the two or more sub-carriers changed in their power, to generate a time-base waveform.

A second storage medium according to the present invention is one storing a demodulation program for demodulating an orthogonal frequency division multiplexed signal. The program comprises the steps of:

receiving two detection axis signals detected by orthogonal detection and sampling respective time-base waveforms of the two detection axis signals at a predetermined sampling frequency;

performing discrete Fourier transform on the respective sampled data to obtain respective phase changes of sub-carriers for each symbol and two or more metrics distributed in a frequency domain;

extracting first data from the respective phase changes of the sub-carriers for each symbol; and extracting second data based on powers of the two or more metrics.

A communication apparatus according to the present invention is one for communicating using an orthogonal frequency division multiplexed signal, and comprises:

a transmission means for performing orthogonal frequency division multiplex modulation on a carrier in accordance with data given by an inputted signal, to transmit a multiplexed signal; and a receiving part for performing orthogonal frequency division multiplex demodulation on the received signal to detect the modulation data and for outputting the signal given by the modulation data. The transmission means is provided with one of the above-described first through fourth orthogonal frequency division multiplexed signal generator. Further, the receiving means is provided with the above-described demodulator.

DESCRIPTION OF THE PREFERRED EMBODIMENTS

Figure 1:
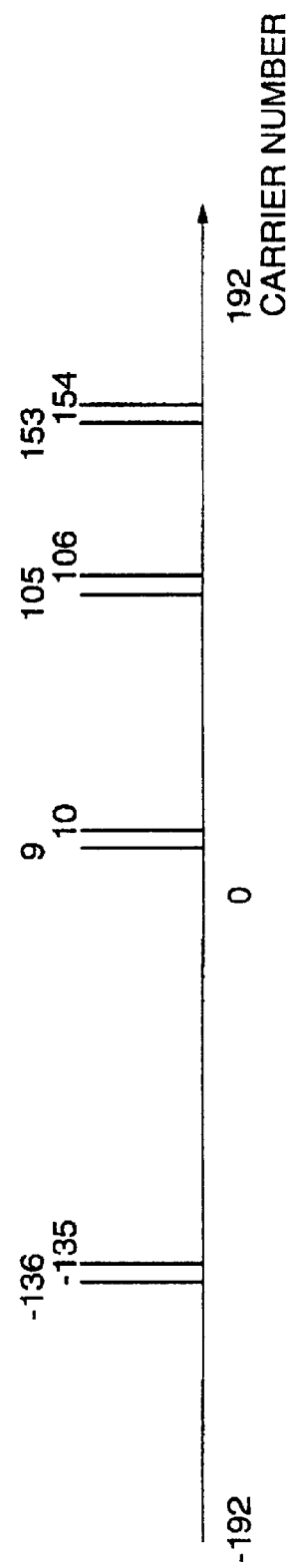
FIG. 1 is a spectrography for explaining an example of carrier arrangement of a TII signal on the frequency axis.

In the following, embodiments of the present invention will be described referring to the drawings.

[First Embodiment]

Now, a first embodiment of the present invention will be described.

Figure 2:
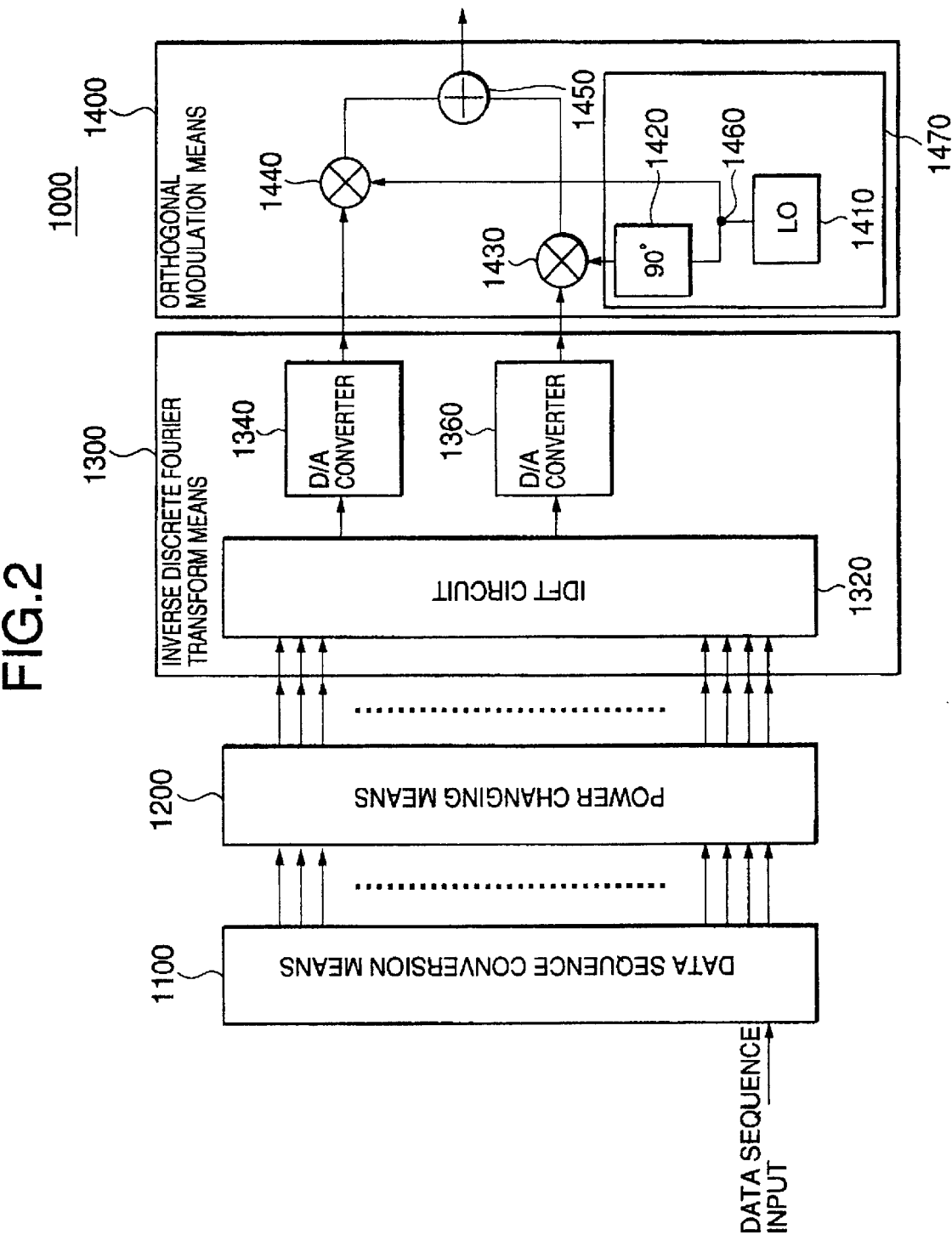
FIG. 2 is a block diagram showing a configuration of an orthogonal frequency division multiplexed signal generator to which the present invention is applied.

FIG. 2 is a block diagram showing a configuration of an orthogonal frequency division multiplexed signal generator to which the present invention is applied.

As shown in FIG. 2, the orthogonal frequency division multiplexed signal generator 1000 according to the present invention comprises a data sequence conversion means 1100, a power changing means 1200, an inverse discrete Fourier transform means 1300, and an orthogonal modulation means 1400.

The data sequence conversion means 1100 converts serially-inputted transmission data to parallel data sequences of the same number as the sub-carriers of OFDM.

For example, in the mode 2 of the EUREKA-147 DAB system, it is converted into 384 data sequences. One sub-carrier comprises in-phase axis data and quadrature axis data, and accordingly, 2 bits of data can be assigned to each sub-carrier. Thus, an OFDM symbol of 384 sub carriers can transmit 768 bits of data.

In predetermined OFDM symbols other than the null symbol, the power changing means 1200 changes powers of complex data comprising the above 384 pairs of in-phase axis data and quadrature axis data in accordance with a TII signal assigned. In other words, in the predetermined OFDM symbols other than the null symbol, the power changing means 1200 changes powers of sub-carriers corresponding to the TII signal so that those powers are different from the powers of the other sub-carriers.

As described above, a TII signal is a code for identifying a transmitting station. A TII signal is generated in terms of a combination of a comb number and a pattern number in accordance with a predetermined rule. For example, a TII signal in the mode 2 of the EUREKA-174 DAB system is determined by a comb number in the range of 0–23 and a pattern number in the range of 0–69. When a comb number is 4 and a pattern number is 16, then, as shown in FIG. 1, four pairs of adjacent sub-carriers are determined.

Figure 3:
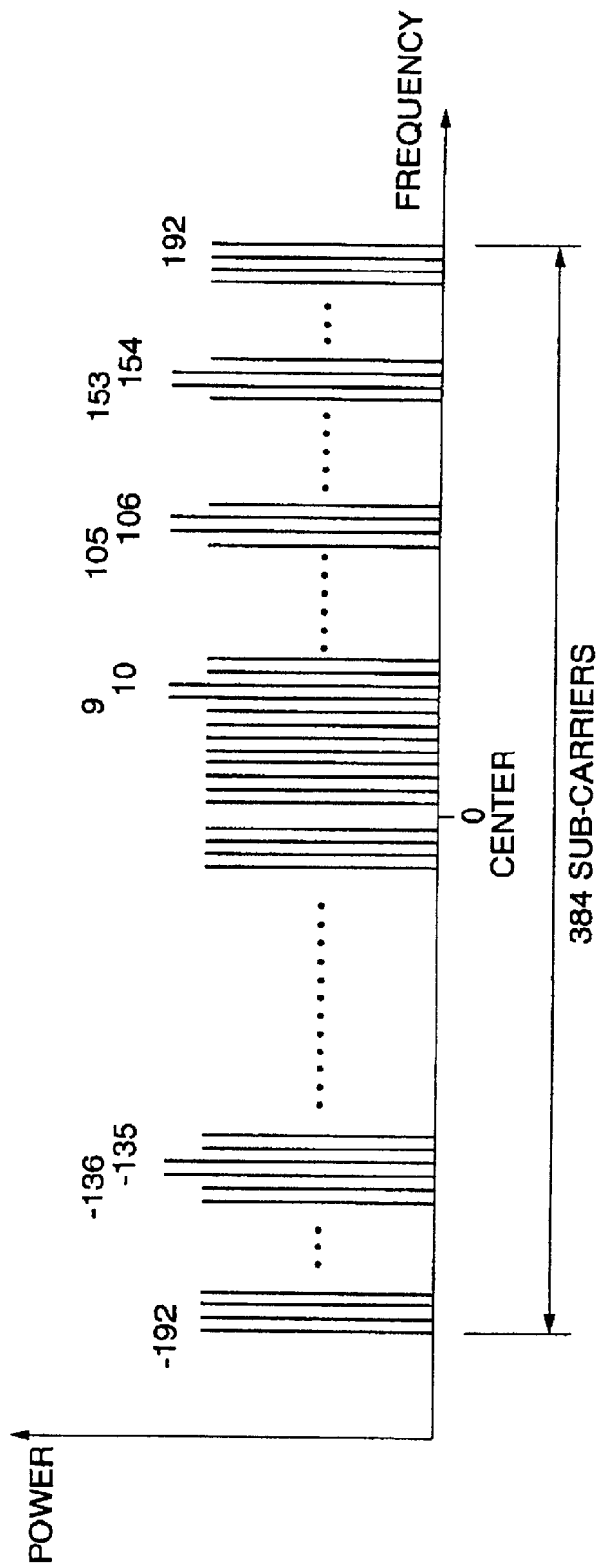
FIG. 3 is a spectrography schematically showing a power distribution of metrics of an OFDM signal on which a TII signal is superimposed.

In that case, the power changing means 1200 raises powers of complex data corresponding to frequencies at which the sub-carriers of FIG. 1 exist, by a predetermined rate (for example 10%). Concretely, a power spectrum as shown in FIG. 3 is obtained.

The inverse discrete Fourier transform means 1300 synthesizes a plurality of sub-carriers into a time-base waveform. The inverse discrete Fourier transform means 1300 comprises an IDFT (Inverse Discrete Fourier Transform) circuit 1320 for performing inverse discrete Fourier transform on complex data and D/A (Digital to Analog) converter 1340, 1360 for converting in-phase axis data and quadrature axis data of complex data, which has been subjected to the inverse discrete Fourier transform, into analog waveforms respectively, to generate a real axis signal and an imaginary axis signal that are orthogonal to each other.

The orthogonal modulation means 1400 uses the real axis signal and the imaginary axis signal to perform orthogonal modulation of the carrier. The orthogonal modulation means 1400 comprises an oscillator 1470, multipliers 1430, 1440, and an adder 1450. The oscillator 1470 generates two signals having a phase difference of 90 degree between them. The multiplier 1430 multiplies one of these two signals by the real axis signal. The multiplier 1440 multiplies the other of these two signals by the imaginary axis signal. The adder 1450 adds together the two signals obtained by these multiplications.

The oscillator 1470 comprises a local oscillator 1410, a distributor 1460, and a phase shifter 1420. The local oscillator 1410 generates a frequency signal corresponding to the carrier. The distributor 1460 distributes the generated frequency signal into two signals. The phase shifter 1420 gives one of the distributed signals a phase delay of 90 degree. The oscillator 1470 may be constituted by two oscillators that oscillate with a phase delay of 90 degree from each other.

Figure 4:
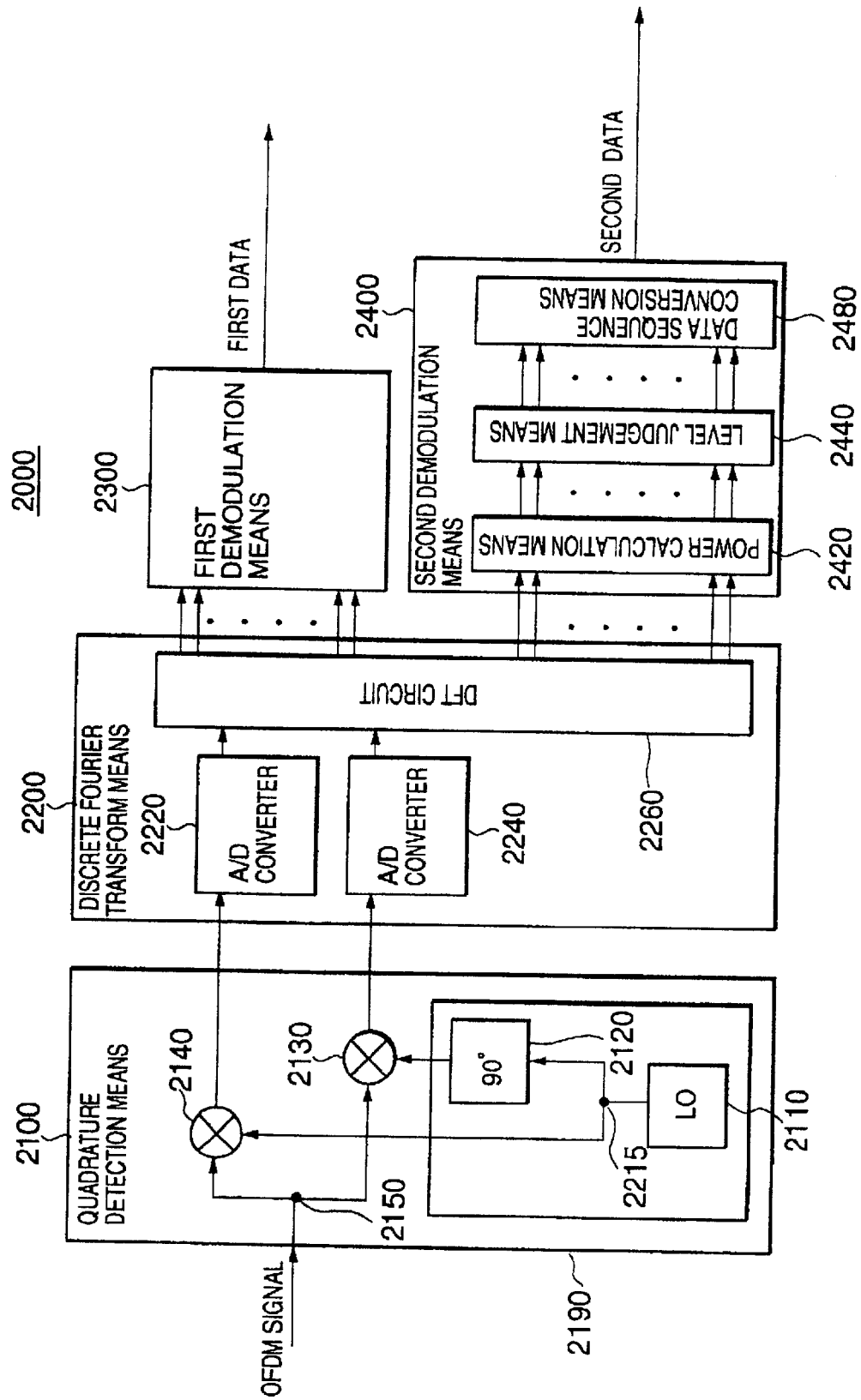
FIG. 4 is a block diagram showing a demodulator according to the present invention.

Next, there will be described a demodulator for demodulating the OFDM signal that has been changed in powers of sub-carriers as described above. FIG. 4 shows a configuration of a demodulator for demodulating the OFDM signal in which the powers of sub-carriers have been changed as described above.

As shown in FIG. 4, the demodulator 2000 comprises a quadrature detection means 2100, a discrete Fourier transform means 2200, a first demodulation means 2300, and a second demodulation means 2400.

The quadrature detection means 2100 receives the OFDM signal, and obtains two detection axis signals that are quadrate to each other, using a reproduction carrier. The two detection axes may be selected as an in-phase axis (I-phase axis) that is in-phase with the received signal and a quadrature axis (Q-phase axis) that is quadrate to the received signal. Here, the two detection axes are not limited to these phases, and it is adequate that the two axes are quadrate to each other. For example, detection axes respectively having phases of +45 and −45 degrees in relation to the received signal may be selected.

As shown in FIG. 4, the quadrature detection means 2100 comprises a distributor 2150, a reproduction carrier generator 2190, and multipliers 2130, 2140. The distributor 2150 distributes a received signal into two signals. The reproduction carrier generator 2190 generates two reproduction carriers X, Y having a phase difference of 90 degree from each other. The multipliers 2130, 2140 multiplies the distributed two signals by the reproduction carriers X, Y, respectively.

The reproduction carrier generator 2190 comprises a variable frequency oscillator 2110, a branch circuit 2115, and a phase shifter 2120. The variable frequency oscillator 2110 is an oscillator that can change its oscillating frequency. The branch circuit 2115 divides the generated oscillation signal into two signals. The phase shifter 2120 gives one of the divided signals a phase delay of 90 degree.

The discrete Fourier transform means 2200 samples each of the I-phase signal and the Q-phase signal at sampling points whose number is larger than the number of sub-carriers contained in the OFDM signal, and performs the discrete Fourier transform on these samples.

As shown in FIG. 4, the discrete Fourier transform means 2200 comprises two A/D (Analog to Digital) converters 2220, 2240 and a DFT (Discrete Fourier Transform) circuit 2260 for performing the discrete Fourier transform operation. With regard to the calculation algorithm for performing the discrete Fourier transform in the DFT circuit 2260, the DFT circuit 2260 may perform the calculation in accordance with the equation defining DFT, or may employ FFT (Fast Fourier Transform). Calculation by FFT can perform DFT calculation with higher speed. The DFT circuit 2260 can be implemented by, for example, a dedicated hard logic. Or, it may be constructed using a general-purpose processing unit provided with a program for executing a DFT process.

The discrete Fourier transform means 2200 outputs the same data to both the first demodulation means 2300 and the second demodulation means 2400.

The data distributed to the sub-carriers is demodulated by the first demodulation means 2300 into the original sequential order. For example, the first demodulation means 2300 is provided with a data sequence conversion means that converts metrics (complex data) of the sub-carriers on the frequency axis obtained in the discrete Fourier transform means 2200, into a serial data sequence in the same order as the order at the time of modulation. The first demodulation means 2300 performs demodulation in the same manner as the conventional case.

The second demodulation means 2400 demodulates second data (in this case, a TII signal) transmitted as changes of respective powers of the sub-carriers into the original sequential order. As shown in FIG. 4, the second demodulation means 2400 comprises a power calculation means 2420, a level judgement (determination) means 2440, and a data sequence conversion means 2480. The power calculation means 2420 calculates respective powers of metrics of the sub-carriers on the frequency axis obtained in the discrete Fourier transform means 2200. The level judgement means 2440 decides to which level the calculated power value of a sub-carrier belongs, among predetermined level values. The data sequence conversion means 2480 converts levels decided for respective transmission units into the original serial data sequence.

By using the TII signal demodulated by the second demodulation means 2400, it is possible to specify the transmitting station that transmitted the OFDM signal.

In the first embodiment, a TII signal may be superimposed on a plurality of OFDM symbols other than the null symbol. For example, between a null symbol and the next null symbol, a TII signal is superimposed on all OFDM symbols other than the null symbols, by power variation. In that case, on the receiving side, by calculating power for every OFDM symbol in this period and by averaging all of them, it is possible to carry out judgement unaffected by disturbance such as noise, fading, and the like. Thus, it is possible to carry out more accurate TII detection.

As described above, according to the present embodiment, it is possible to superimpose a TII signal on an OFDM symbol other than a null symbol. Since a TII signal is not superimposed on the null symbol, detection of the null symbol is made easy.

Further, with regard to data transmitted by the phase modulation, the conventional demodulator also can demodulate it.

[Second Embodiment]

Next, a second embodiment of the present invention will be described.

A configuration of an orthogonal frequency division multiplexed signal generator of the present embodiment is similar to the configuration of the orthogonal frequency division multiplexed signal generator of the first embodiment shown in FIG. 2. In the following, different part from the first embodiment will be mainly described.

Until main data (first data) is inputted to the power changing means 1200, processing is the same as the first embodiment.

In the present embodiment, second data is inputted to the power changing means 1200. Examples of the second data include data related to program contents as main data, other news, various auxiliary information, and the like.

Figure 5:
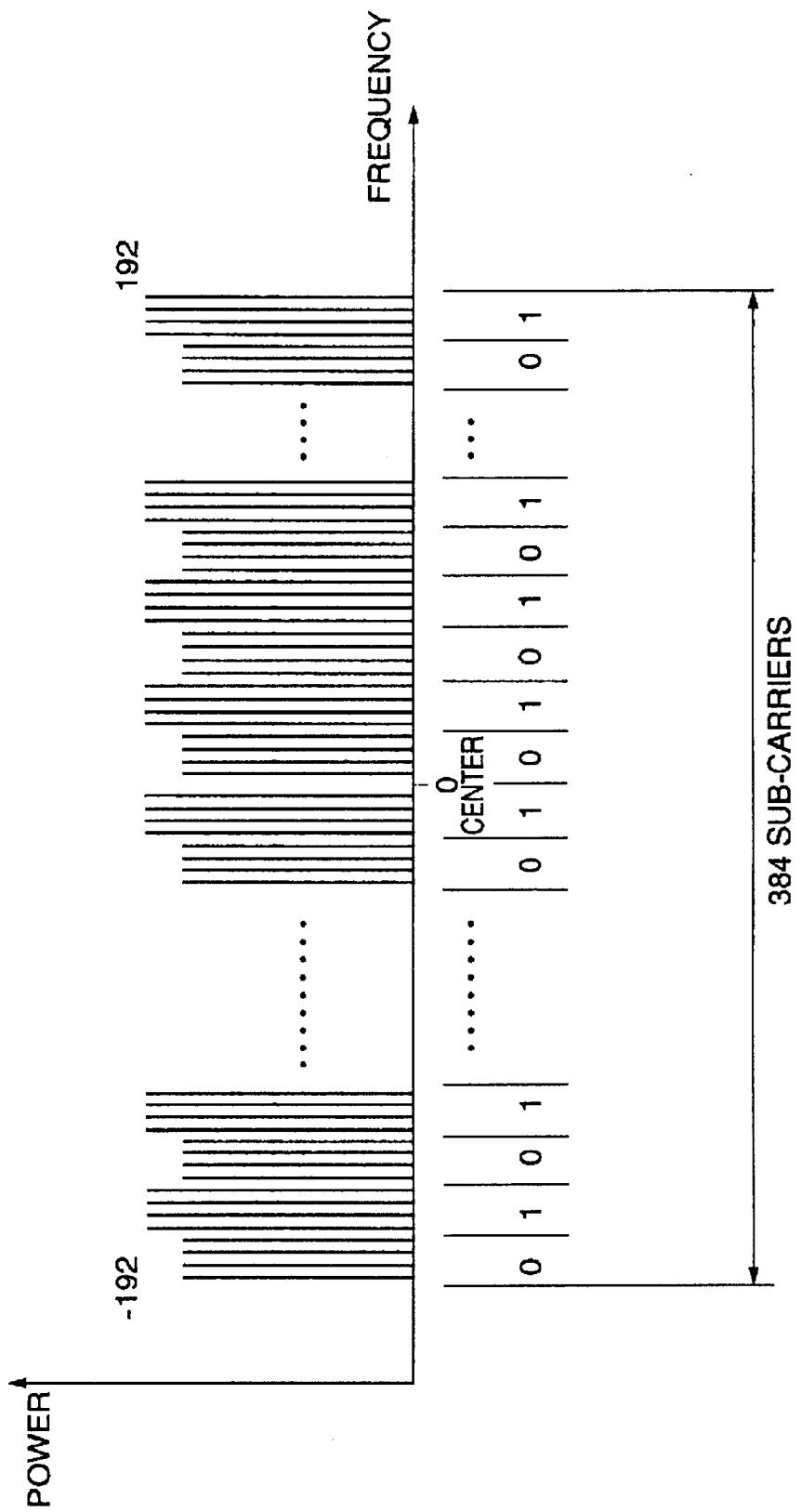
FIG. 5 is an explanatory view schematically showing a power distribution of metrics of an OFDM signal on which a second transmission data is superimposed.

In accordance with the inputted second data, the power changing means 1200 changes powers of the corresponding sub-carriers (powers of complex data). In the present embodiment, as shown in FIG. 5, one bit of the second data is assigned to four sub-carriers of an OFDM signal. The mode 2 of the EUREKA-147 DAB system has 384 sub-carriers, and accordingly, can transmits 96 bits of the second data in one OFDM symbol duration. FIG. 5 shows a state of the sub-carriers after the power conversion, when the second data sequence is "01010101 . . . ". In this example, the power of a sub-carrier corresponding to data "1" is raised by 10% as compared to the power of a sub-carrier corresponding to data "0".

Next, details of processing in the data sequence conversion means 1100 and the power changing means 1200 in the present embodiment will be described.

The data sequence conversion means 1100 converts serially-inputted first data to data pairs of a real part and an imaginary part, being equal in number to the number N of the transmitting carriers. In detail, the first data sequence:

$$Di=\{Di(0), Di(1), Di(2), Di(3), \ldots, Di(2N-2), Di(2N-1)\}$$

inputted for each OFDM symbol is formed into N data pairs:

$$Di=\{(Di(0), Di(1)), (Di(2), Di(3)), \ldots, (Di(2N-2), Di(2N-1))\}$$

regarding the even data as real part and the odd data as imaginary part.

Further, the data sequence conversion means 1100 converts each data pair so that amplitude (power) of the data becomes 1. In detail, when each data Di takes either the value 1 or the value 0, each data pair is converted to:

$$Dp(n)=[(1-2Di(2n))+j(1-2Di(2n+1))]/\sqrt{2}$$

where n=0, 1, 2, . . . , N−1.

Figure 6:
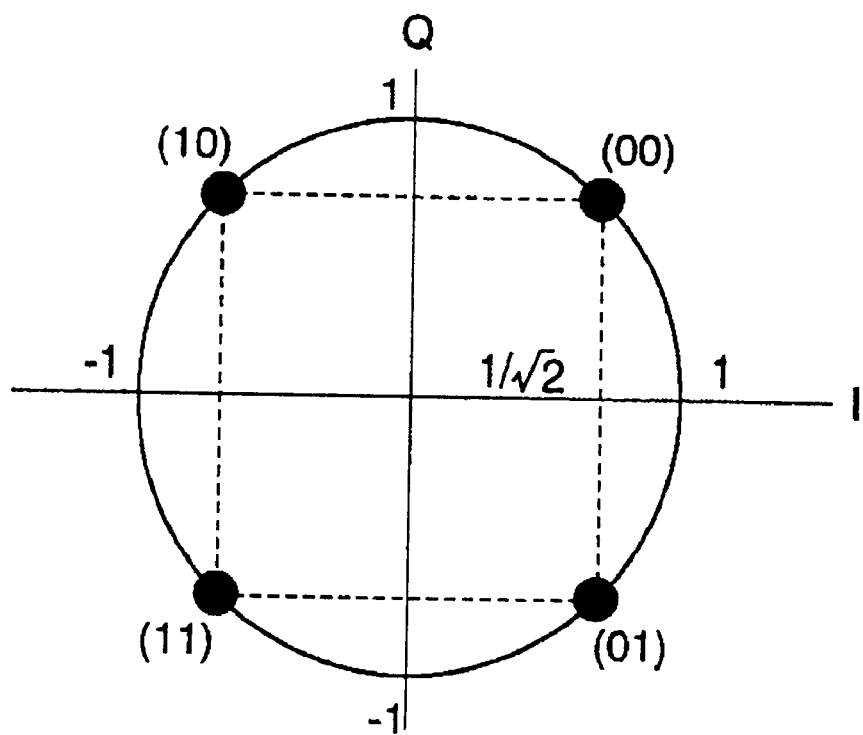
FIG. 6 is a diagram showing a phase arrangement of a data pair.

Then, as shown in FIG. 6, each data pair takes a phase location on the circumference with the radius 1.

The power changing means 1200 converts these data pairs so that their powers vary in accordance with the second data.

In detail, when the second data sequence inputted per OFDM symbol is:

$$Ds = \{Ds(0), Ds(1), Ds(2), Ds(3), \ldots, Ds(N/4-1)\},$$

then, since Ds takes either the value 0 or the value 1, a variation rate of the amplitude is defined as follows:

when $Ds(m)=0$, then, ×1 when $Ds(m)=1$, then, $\times\sqrt{1.1}$ where m=0, 1, ..., N/4−1.

Namely, the amplitudes of the first data pairs Dp are changed by Ds as follows:

when $Ds(n)=0$, then $Dp(4n), Dp(4n+1), Dp(4n+2), Dp(4n+3) \rightarrow Dp(4n), Dp(4n+1), Dp(4n+2), Dp(4n+3)$ when $Ds(n)=1$, then $Dp(4n), Dp(4n+1), Dp(4n+2), Dp(4n+3) \rightarrow Dp(4n)\times\sqrt{1.1}, Dp(4n+1)\times\sqrt{1.1}, Dp(4n+2)\times\sqrt{1.1}, Dp(4n+3)\times\sqrt{1.1}$ where n=0, 1, ..., N/4−1.

Each data pair subjected to the above power conversion takes a phase location on the circumference with the radius $\sqrt{1.1}$. As for the phase, it is not changed.

The OFDM signal changed in respective amplitudes (powers) of the sub-carriers in accordance with the second data as described above can be demodulated by the demodulator shown in FIG. 4.

The processing until the received signal inputted into the quadrature detection means 2100 is converted to metrics of the sub carriers on the frequency axis in the discrete Fourier transform means 2200 is the same as the above-described first embodiment.

The second demodulation means 2400 demodulates the second data transmitted as the change in the powers of the sub-carriers into the original sequential order.

The power calculation means 2420 of the second demodulation means 2400 calculates power value P from metrics of the sub-carriers (complex data) obtained in the discrete Fourier transform means 2200. In the metrics distribution obtained as the result of the discrete Fourier transform, 384 effective metrics are lined in series in the mode 2 of the EUREKA-147 DAB system, for example.

Each metric $Z_i$ is expressed as $(a_i+jb_i)$, where j is the imaginary unit and i is a suffix indicating a frequency slot in which that metric is obtained.

Power P can be defined as:

$$P = Z^2 \quad (101)$$
$$= Z \cdot Z^* = Z^* \cdot Z$$

where Z* is the complex conjugate of Z.

Namely, the power of metric Z=(a+jb) is given by:

$$P = (a+jb)(a-jb) \quad (102)$$
$$= (a \cdot a + b \cdot b)$$

The level judgement means 2440, for example, averages the power values Pi of the sub-carriers for every four carriers, and compares each average with a predetermined threshold to judge which data value "1" or "0" it corresponds to.

The method of averaging is given, for example, by:

$$MP_i = (P_i + P_{i+1} + P_{i+2} + P_{i+3})/4 \quad (103)$$

where $P_i$, $P_{i+1}$, $P_{i+2}$ and $P_{i+3}$ are powers of sub-carriers.

The data sequence conversion means 2480 converts the second data values obtained in the level judgement means 2440 into the originally-transmitted order and outputs them.

Also in the second embodiment, the same second data may be superimposed on a plurality of OFDM symbols, similarly to the first embodiment. In that case too, it is possible to make judgement unaffected by disturbance such as noise, fading, and the like, by performing an averaging process for each period of superimposing the second data, similarly to the above, and thus, it is possible to perform more accurate demodulation of the second data.

As described above, according to the present embodiment, it is possible to modulate a plurality of data independently to transmit them. In other words, in addition to first data transmitted in an OFDM signal by phase modulation, it is possible to transmit second data independent of the first data.

[Third Embodiment]

Next, a third embodiment of the present invention will be described. Here, by way of example, a case that the minimum unit of the second transmission data is four bits will be described.

An orthogonal frequency division multiplexed signal generator according to the present embodiment comprises components similar to the orthogonal frequency division multiplexed signal generator shown in FIG. 2. In the following, different points from the second embodiment will be described.

Figure 7:
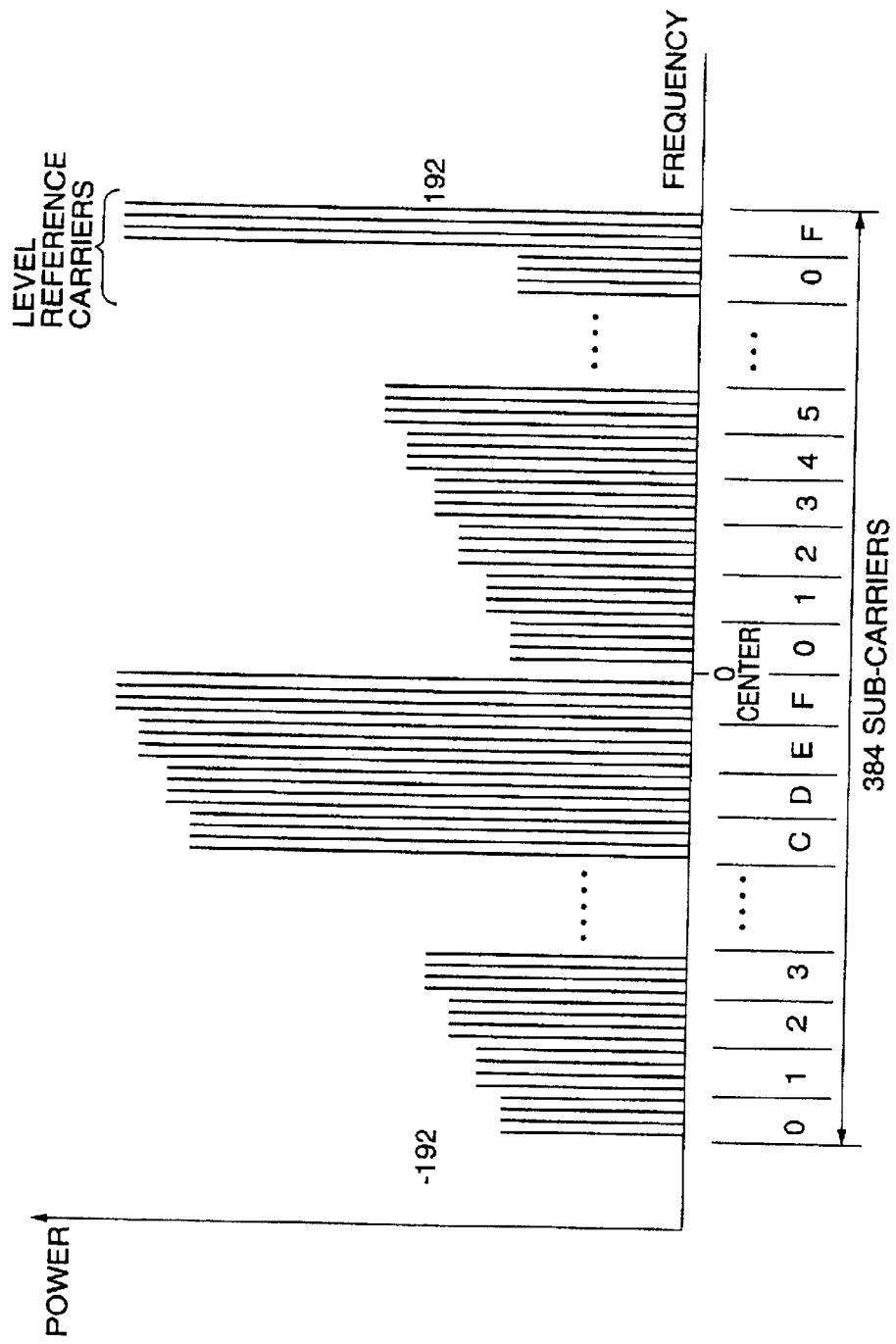
FIG. 7 is an explanatory view schematically showing a power distribution of metrics of an OFDM signal on which a second transmission data is superimposed.

In the present embodiment, as shown in FIG. 7, the power changing means 1200 assigns four bits of the second data to four sub-carriers of an OFDM signal, and, in accordance with the second data, changes powers of corresponding sub-carriers to one of 16 levels ($2^4$=16). The mode 2 of the EUREKA-174 DAB system has 384 sub-carriers, and accordingly, in the present case, can transmits 384 bits of the second data in one OFDM symbol duration. FIG. 7 shows a state after the respective power conversions of the sub-carriers when the second data sequence is "0123456789ABCDEF012345 . . . OF".

Power of a carrier for each data value of 0–F is decided by changing power by 5% at every level, taking the power of the data "0" as 100%. For example, the power of the data "1" is raised by 5% as compared to the power of the data "0", and the power of the data "2" is raised by 10% as compared to the power of the data "0".

Further, the power calculation means 2420 of the present embodiment utilizes a part of the carriers as level reference carriers. Namely, as shown in FIG. 7, with regard to the last eight carriers, the power conversion part 2420 of the present embodiment converts the powers of the former four carriers to the power corresponding to "0" (the minimum level) of the second data and the latter four carriers to the power corresponding to "F" (the maximum level) of the second data. These level reference carriers can be employed for level determination at the time of demodulation of the second data.

The OFDM signal changed in powers of the sub-carriers in accordance with the second data as described above is demodulated by the demodulator shown in FIG. 4.

In the following, different points from the above embodiments will be described.

Using the last eight carriers of an OFDM symbol, the level judgement means 2440 of the second demodulation means 2400 confirms the carrier powers of the lowest level "0" and the highest level "F" of the second data, and divides the interval equally into 15 parts to obtain the minimum level difference.

Namely, the minimum level difference Pd is obtained by:

$Pd$=[(carrier power of the highest level "$F$")–(carrier power of the lowest level "0")]/15.

Then, the level judgement means 2440 sets a threshold for judgement of each level, so as to decide a level of each carrier.

Each threshold is obtained by successively adding Pd to the carrier power of the lowest level "0".

Figure 8:
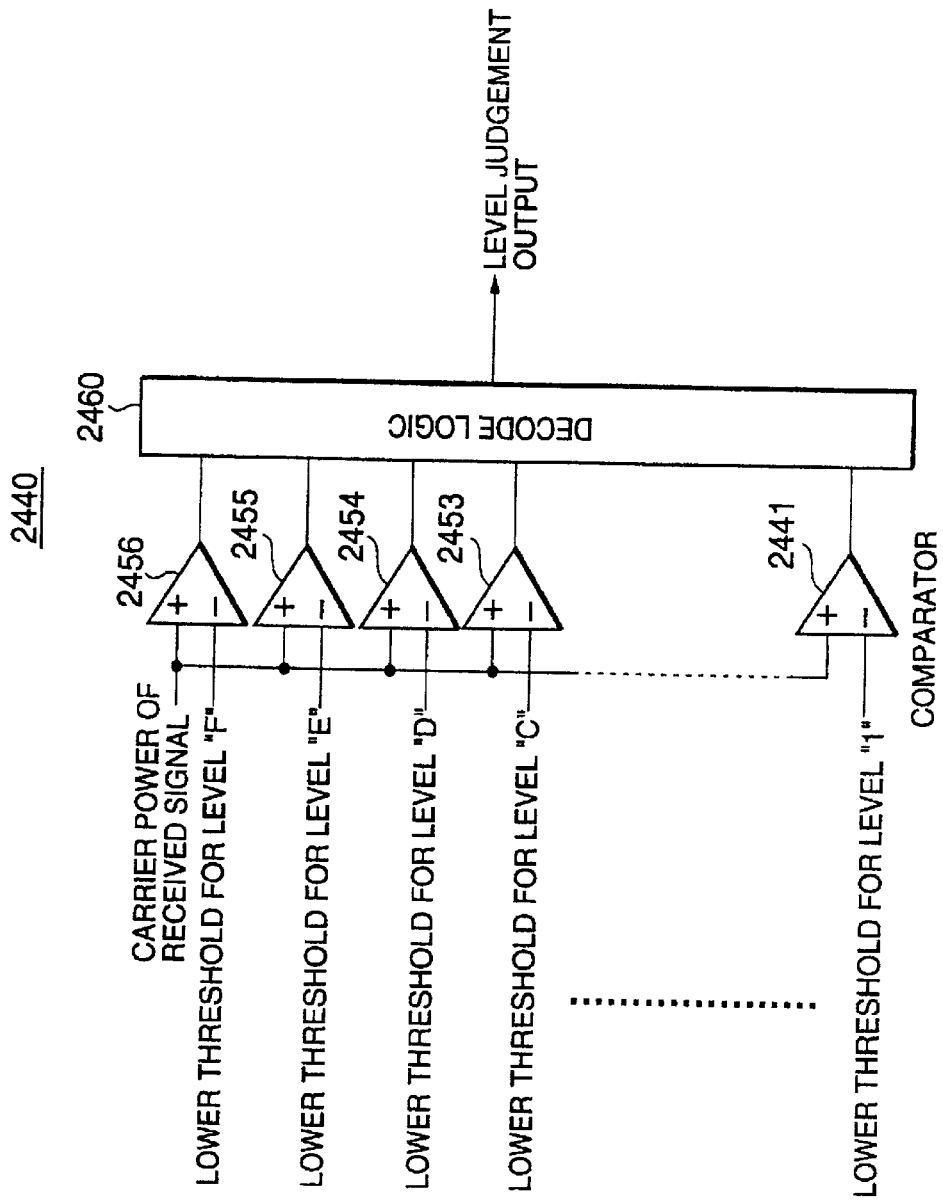
FIG. 8 is a block diagram showing an example of circuit structure of a level judgement means.

Lower threshold for the level "b 1"=(the carrier power of the lowest level)+$Pd$ Lower threshold for the level "2"=(the lower threshold for the level "1")+$Pd$ Lower threshold for the level "3"=(the lower threshold for the level "2")+$Pd$ Lower threshold for the level "$F$"=(the lower threshold for the level "$E$")+$Pd$ FIG. 8 is a diagram showing an example of circuit structure of the level judgement means 2440. As shown in FIG. 8, the level judgement means 2440 comprises sixteen comparators 2441–2456, and a decode logic 2460. This level judgement means 2440 compares respective powers of the carriers with the thresholds obtained as described above, to decide a value "0"–"F" the second data corresponding to each power.

According to the present embodiment, in demodulating the second data superimposed as amplitude levels of respective sub-carriers, it is possible to carry out demodulation utilizing the received reference levels. Accordingly, it is possible to improve accuracy in demodulating the second data.

In the third embodiment, the level reference carriers are inserted for every OFDM symbol. However, the mode of inserting the level reference carriers is not limited to this, and the level reference carriers may be inserted once in a plurality of OFDM symbol periods (for example, one frame period). Further, the place of insertion is not limited particularly, and insertion into a predetermined position is sufficient. Further, in the third embodiment, the carrier powers of the lowest level and the highest level are assigned to each four carriers of the last eight carriers. However, each of the four carriers may be separately positioned, without being gathered in one place.

[Fourth Embodiment]

Next, a forth embodiment of the present invention will be described. In the present embodiment, the second data is superimposed a plurality of times on an OFDM symbol.

An orthogonal frequency division multiplexed signal generator in the present embodiment comprises component similar to the first embodiment shown in FIG. 2.

Figure 9:
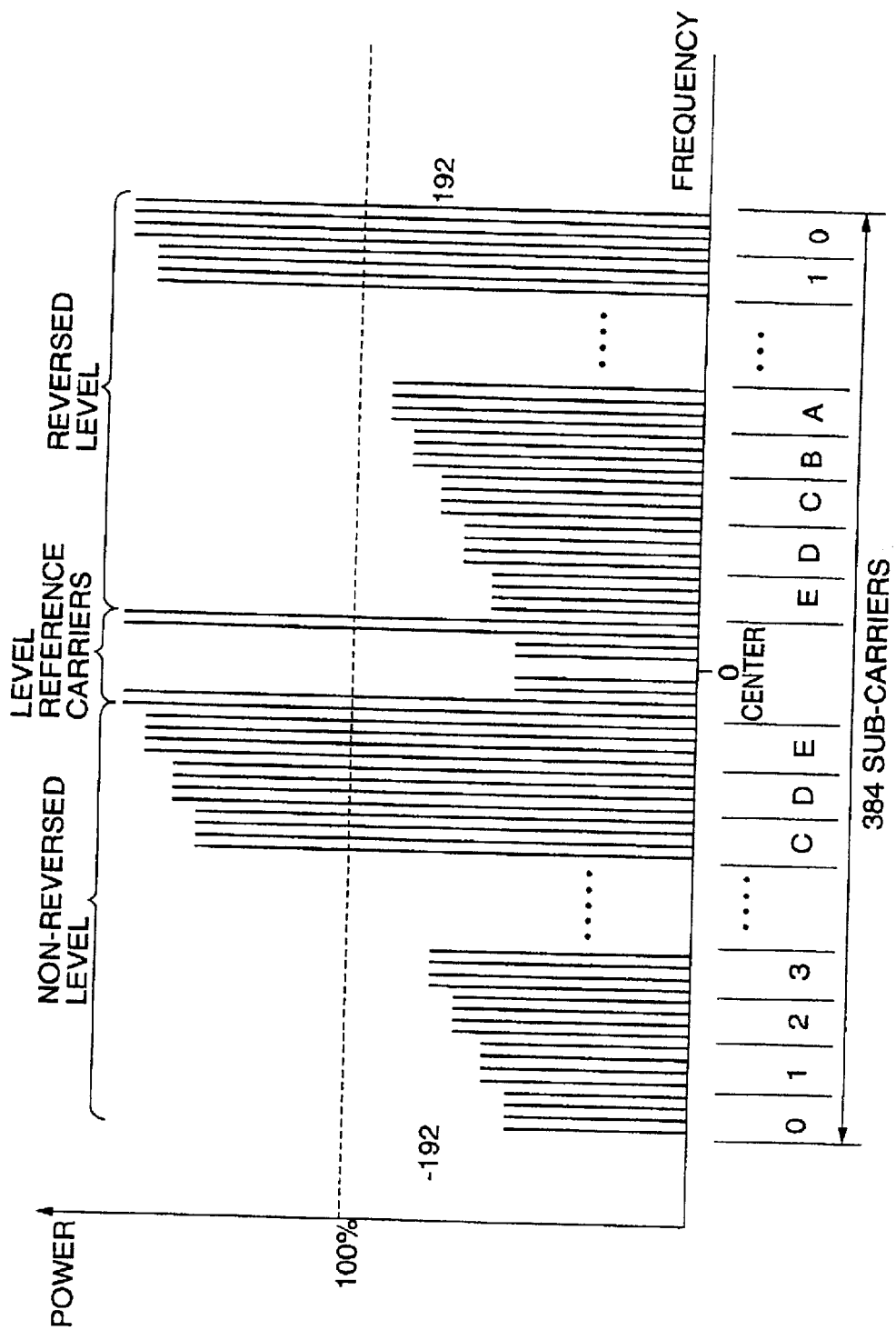
FIG. 9 is an explanatory view schematically showing a power distribution of metrics of an OFDM signal on which a second transmission data is superimposed.

Similarly to the third embodiment, the power changing means 1200 of the present embodiment also assigns four bits of the second data to four sub-carriers of an OFDM signal, and, in accordance with the second data, changes powers of corresponding sub-carriers to one of 16 levels. Further, as shown in FIG. 9, the sub-carriers are divided into a higher frequency side and a lower frequency side symmetrically with respect to the central frequency of an OFDM symbol that forms the boundary between both sides, and the same second data is superimposed on each side.

Further, polarities of the sub-carriers transmitting the second transmission data are reversed between both sides of the central frequency. Namely, on the lower frequency side, powers of the sub-carriers are changed in proportion to respective values of the second data, and on the higher frequency side, the powers are changed in reverse proportion to the respective values of the second data. By this operation, it is possible to keep average power of the changed OFDM constant.

For example, when the power of the data "8" is taken as 100%, on the lower frequency side, the power of the data "7" is lowered by 5% as compared to the power of the data "8", and the power of the data "9" is raised by 5% as compared to the power of the data "8". On the other hand, on the higher frequency side, the power of the data "7" is raised by 5% as compared to the power of the data "8", and the power of the data "9" is lowered by 5% as compared to the power of the data "8".

Further, similarly to the third embodiment, level reference carriers are inserted into an OFDM symbol.

Namely, as shown in FIG. 9, powers of four carriers before and after the central frequency are converted to the power corresponding to the lowest level, and further, powers of four carriers before and after those carriers are converted to the power corresponding to the highest level. These level reference carriers can be used for level judgement at the time of demodulation of the second data.

Since the mode 2 of the EUREKA-147 DAB system has 384 sub-carriers, in the present embodiment, 188 bits of the second data can be transmitted in one OFDM symbol duration. FIG. 9 shows a state after the respective power conversions of the sub-carriers when the second data sequence is "0123456789ABCDEF012345 . . . CDE". Namely, the second data is superimposed on the sub-carriers ranging from the lowest frequency toward the central frequency, excepting the four carriers previous to the central frequency. Further, in order to be symmetrical with respect to the central frequency, the second data is similarly superimposed on the higher frequency side, so that the carriers have powers in reverse proportion to the second data.

The OFDM signal changed in powers of the sub-carriers in accordance with the second data as described above can be demodulated by the demodulator shown in FIG. 4.

In the following, different points from the above embodiments will be described.

The level judgement means 2440 of the second demodulation means 2400 uses the eight level reference carriers inserted before and after the center of each OFDM symbol as described above to calculate respective thresholds for judgement of the levels similarly to the third embodiment. Then, the level judgement means 2440 compares power of each carrier with those thresholds using the circuit structure shown in FIG. 8, to decide a level "0"–"F" the second data corresponding to that power. In the present embodiment, the level judgement means 2440 performs the level judgement, taking it into consideration that the correspondence between power of a carrier and a data value is reversed between the lower frequency side and the higher frequency side.

Further, it is possible to reduce effect of noise and interference by averaging every four carriers transmitting the superimposed second data on each of the lower frequency side and the higher frequency side before performing the level judgement, and, after the level judgement, by averaging the results of judgements on the lower frequency side and the higher frequency side.

In the fourth embodiment, the second data is superimposed twice for each OFDM symbol. However, superimposition may be repeated more than twice. For example, the whole carriers may be divided into four parts, and the second data may be superimposed fourfold, employing a predetermined polarity for each part. In that case, on the receiving side, after performing level judgements for each part of carriers expressing the same data, the level in question may be decided by majority.

As described above, according to the present embodiment, it is possible to keep total power of an OFDM signal constant by reversing polarities of the amplitude modulation between pairs of sub-carriers.

The second data described in the first through fourth embodiments may be different or the same for each OFDM symbol. When the same data is transmitted, by averaging the transmitted data, it is possible to perform high-precision data transmission. Further, the method of superimposing the second data on an OFDM symbol may be the same for every OFDM symbol or may be changed for each OFDM symbol.

[Fifth Embodiment]

Next, a fifth embodiment of the present invention will be described.

First, a guard interval of an OFDM symbol will be described. Each OFDM symbol has a period called a guard interval. The guard interval is a period in which the same signal as the terminal part of an OFDM symbol duration is added to the head of the OFDM in question repeatedly.

By adding this guard interval, it is possible to perform demodulation being unaffected by an adjacent OFDM symbol, even when there is a multi-path signal falling within the guard interval.

Even the multi-path conditions having a reflected wave falling within thus-described guard interval generates fading in which a desired wave transmitted from a transmitter and received directly by a receiver and a reflected wave transmitted from the transmitter and received by the receiver after reflected by a mountain or a building interfere with each other to decline the sub-carriers. However, sub-carriers of each OFDM symbol are subjected to frequency interleaving according to predetermined order. Accordingly, even when one or more sub-carriers are declined owing to fading and are not demodulated correctly, this effect can be cancelled by subsequent error correction.

Figure 13:
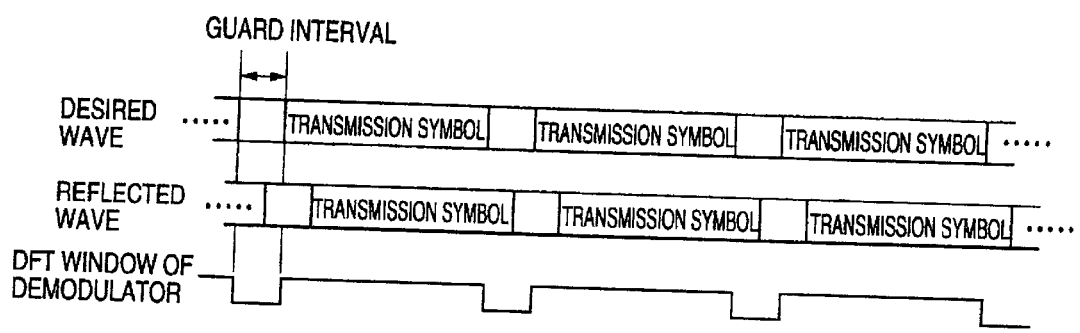
FIG. 13 is an explanatory view for explaining a guard interval.

Next, the effect of the guard interval will be described referring to a drawing. FIG. 13 is a view for explaining the effect of the guard interval.

When, under the multi-path conditions in which both a desired wave and a reflected wave exist, a delay of the reflected wave from the desired wave is shorter than the guard interval, DFT windows may be generated at suitable intervals in a demodulator provided in a receiver so that the window includes only a reflected wave component of the same OFDM symbol as the desired wave.

The EUREKA-147 DAB system transmits information using the differential QPSK. Thus, when a phase difference between a desired wave and a reflected wave does not become 180 degree, sub-carriers are not declined very much, and phase differences between OFDM symbols are maintained, so that correct demodulation is possible. Further, even if the phase difference between a desired wave and a reflected wave becomes 180 degree and the sub-carriers are declined largely to be demodulated as erroneous values, their restoration is possible in a degree by subsequent de-interleaving and error correction.

However, in a state that demodulation can not be carried out correctly such as multi-path conditions in which there are a reflected waves exceeding a guard interval, or environment in which sufficient field strength can not be obtained, in mobile receiving or the like, demodulation output may become incorrect, also. For example, there may happen such a state as interruption of voice output. Thus, it leads to loss of a part or all of receiving data, and a user misses information such as a music program that he or she wants to listen.

Further, when a user who has planned to listen a broadcast can not receive that broadcast for some reason, for example, when there is not a receiver near at hand, or when he or she notices the program after its broadcasting time passed, usually that program can not be listened unless it is rebroadcasted.

From these circumstances, a service of staggered broadcasting of a program is hoped for. Namely, a service of retransmitting a broadcast of the same contents after a predetermined time period is considered in order to comply with such request.

However, to carry out the staggered broadcasting, generally a plurality of frequency blocks are occupied. Therefore, its realization is difficult in such countries and districts where the frequency situation is not good. Further, if it could be realized, it is necessary to inform a listener which frequency provides a staggered broadcasting service corresponding to a broadcast selected now. It is possible to newly add information to this end so that the selection becomes possible on the receiver'side. However, it requires change in the present broadcasting format, and thus the standards must be changed.

Further, to provide the staggered broadcasting service on another frequency, a broadcasting corporation must install new broadcast equipment, inviting heavy expenditure.

The present embodiment utilizes the present invention to realize staggered broadcasting without causing the above-described problems.

In the present embodiment, in addition to the first data transmitted by phase modulation of sub-carriers, data that has the same contents as the first data and is delayed for a predetermined time is transmitted as the second data.

Figure 10:
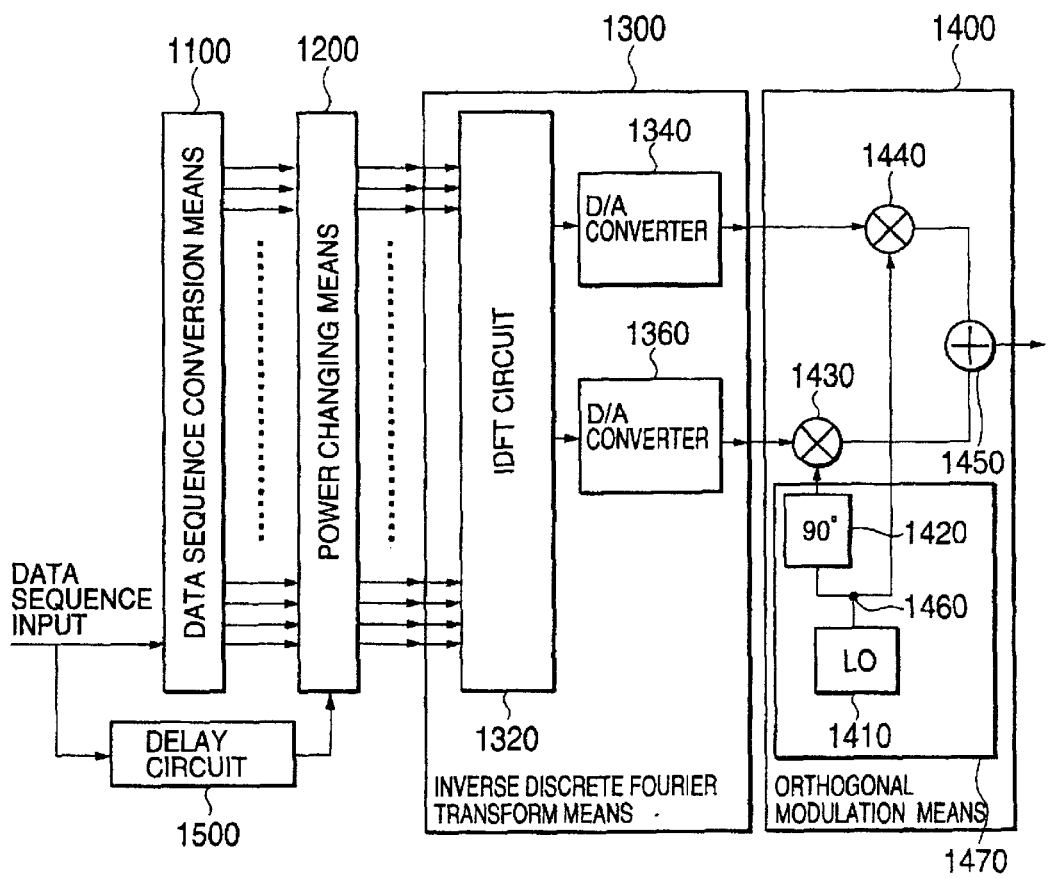
FIG. 10 is a block diagram showing an example of the orthogonal frequency division multiplexed signal generator of the present invention.

FIG. 10 is a block diagram showing a configuration of an orthogonal frequency division multiplexed signal generator according to the present embodiment. As shown in FIG. 10, the orthogonal frequency division multiplexed signal generator 5000 comprises a data sequence conversion means 1100, a power changing means 1200, an inverse discrete Fourier transform means 1300, an orthogonal modulation means 1400, and a delay circuit 1500.

The orthogonal frequency division multiplexed signal generator 5000 is obtained by adding the delay circuit 1500 to the orthogonal frequency division multiplexed signal generator 1000 shown in FIG. 2.

The data sequence conversion means 1100 converts data inputted as serial data to parallel data sequences of the same number as the sub-carriers of OFDM to transmit them as first data.

In predetermined OFDM symbols other than the null symbol, the power changing means 1200 changes power of complex data comprising in-phase axis data and quadrature axis data, in accordance with second data.

The serial data (first data) inputted to the orthogonal frequency division multiplexed signal generator 5000 is delayed for a predetermined time (for example, 5–10 minutes) to be used as the second data.

The delay circuit 1500 delays the first data by the frame. Accordingly, each symbol is arranged in the same position within their respective frames, with a null symbol corresponding to a null symbol and a phase reference symbol to a phase reference symbol, for example.

The orthogonal frequency division multiplexed signal generator 5000 carries out transmission of the second data having the same contents as the first data by modulating respective amplitudes (powers) of the sub-carriers of an OFDM symbol. In order that one OFDM symbol may transmit the second data having the equivalent information content to the first data, the bit number of the second data transmitted by one sub-carrier is determined to be the same as or larger than the bit number of the first data transmitted by one sub-carrier.

The first data is transmitted by the OFDM system. As described above, in the OFDM system, one sub-carrier consists of in-phase axis data and quadrature axis data, and accordingly, two bits of data are assigned to each sub-carrier carrier. In the present embodiment, the power changing means 1200 assigns two bits of the second data to each sub-carrier carrier, and converts power of each sub-carrier to one of four ($=2^2$) levels in accordance with the data value.

Figure 11:
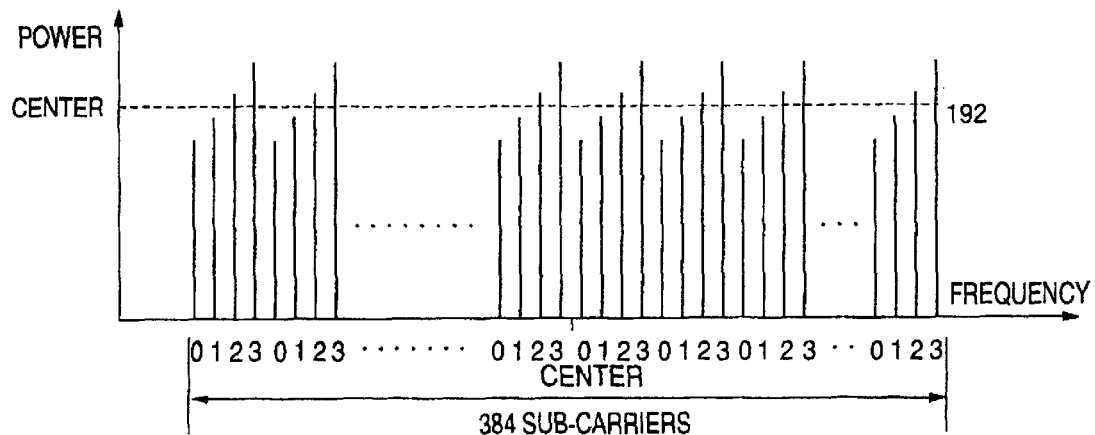
FIG. 11 is a spectrography schematically showing a power distribution of metrics of an OFDM signal on which a delay data is superimposed.

FIG. 11 is a spectrography schematically showing a power distribution of metrics of an OFDM signal in the present embodiment. In order that a power ratio to each value may become uniform, taking the power in the middle of the powers of the data "1" and the data "2" as the reference, a power difference between adjacent data is made, for example, to be 10% of the reference power. FIG. 11 shows a state after the respective power conversion of the sub-carriers when the second data is "0, 1, 2, 3, . . . ".

The inverse discrete Fourier transform means 1300 synthesizes a plurality of sub-carriers into a time-base waveform. As shown in FIG. 10, the inverse discrete Fourier transform means 1300 comprises an IDFT circuit 1320 for performing inverse discrete Fourier transform on complex data, and D/A converters 1340, 1360 for converting in-phase axis data and quadrature axis data of complex data, which has been subjected to the inverse discrete Fourier transform, into analog waveforms respectively, to generate a real axis signal and an imaginary axis signal that are orthogonal to each other.

The orthogonal modulation means 1400 uses the real axis signal and the imaginary axis signal to perform orthogonal modulation of the carrier. The orthogonal modulation means 1400 comprises an oscillator 1470, multipliers 1430, 1440, and an adder 1450. The oscillator 1470 generates two signals having a phase difference of 90 degree between them. The multiplier 1430 multiplies one of these two signals by the real axis signal. The multiplier 1440 multiplies the other of these two signals by the imaginary axis signal. The adder 1450 adds together the two signals obtained by these multiplications.

The oscillator 1470 comprises a local oscillator 1410, a distributor 1460, and a phase shifter 1420. The local oscillator 1410 generates a signal having a frequency corresponding to the carrier. The distributor 1460 distributes the generated frequency signal into two signals. The phase shifter 1420 gives one of the distributed signals a phase delay of 90 degree. The oscillator 1470 may be constituted by two oscillators that oscillate with a phase delay of 90 degree from each other.

The OFDM signal changed in respective powers of sub-carriers carriers as described above is received and demodulated by the demodulator shown in FIG. 4.

In the following, different points from the above embodiments will be described.

In the present embodiment, the second data is obtained by delaying the first data by the frame. Accordingly, phase reference symbols of both the first data and the second data have the same position within a frame. Further, data of individual sub-carriers constituting the phase reference symbol is known. Therefore, the level judgement means 2440 of the second demodulation means 2400 can confirm the carrier powers of the lowest level "0" and the highest level "3" of the second data, using the data values of the phase reference symbols and the corresponding amplitudes of the phase reference symbols. The interval between them is divided equally into 3 parts to obtain the minimum level difference.

Namely, the minimum level difference Pd is obtained by:

Pd=[(carrier power of the highest level "3")–(carrier power of the lowest level "0")]/3.

Then, the level judgement means 2440 sets a threshold for judgement of each level, so as to decide a level of each carrier. Each threshold is obtained by successively adding Pd to the carrier power of the lowest level "0".

Lower threshold for the level "1"=(the carrier power of the lowest level)+Pd

Lower threshold for the level "2"=(the lower threshold for the level "1")+Pd

Lower threshold for the level "3"=(the lower threshold for the level "2")+Pd

Figure 12:
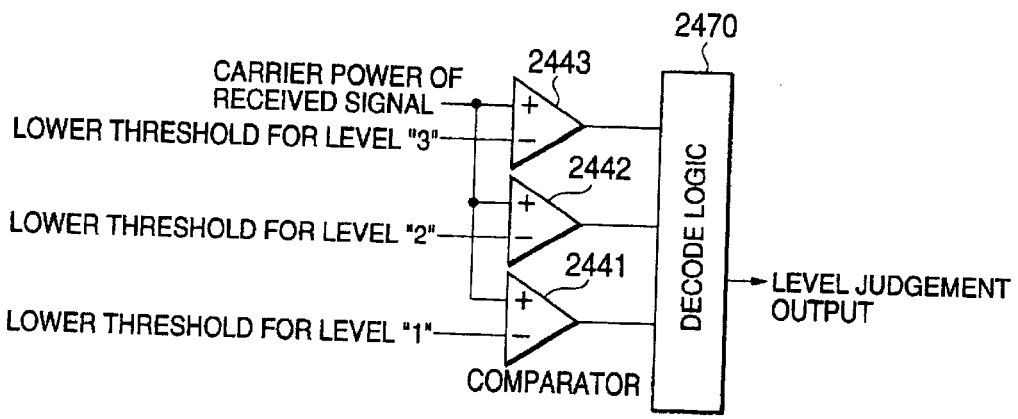
FIG. 12 is a block diagram showing an example of circuit structure of a level judgement means.

FIG. 12 is a block diagram showing an example of circuit structure of the level judgement means 2440.

As shown in FIG. 12, the level judgement means 2440 comprises three comparators 2441–2443, and a decode logic 2470. The level judgement means 2440 compares respective powers of the carriers with the thresholds obtained as described above, to decide a value of the second data "0"–"3" corresponding to each power.

As described above, according to the present embodiment, in addition to the first data transmitted in an OFDM signal by phase modulation, it is possible to transmit the second data that has the same contents as the first data and is delayed for a predetermined time.

The data sequence conversion means, the power changing means, and the inverse discrete Fourier transform means in the above-described orthogonal frequency division multiplexed signal generators may be realized either by hardware and/or software.

When they are realized using software, a general purpose CPU or DSP (Digital Signal Processor) may execute an orthogonal frequency division multiplexed signal generating program stored in a memory such as RAM or ROM.

Such an orthogonal frequency division multiplexed signal generating program includes procedures in which, for example, the first data is arranged in a predetermined order in accordance with two or more sub-carriers orthogonal to each other on the frequency axis, a power spectrum of those sub-carriers is changed at a predetermined rate of power in accordance with the second data, and the two or more sub-carriers changed in their powers are subjected to the inverse discrete Fourier transform to generate a time-base waveform.

Further, similarly, the discrete Fourier transform means and the first and second demodulation means in the above-described demodulator may be realized by a computer and a demodulation program executable by the computer. This demodulation program includes procedures for instructing the computer to perform the steps of, for example, receiving two detection axis signals detected by the quadrature detection, sampling respective time-base waveforms of those two detection axis signals at a predetermined sampling frequency, performing the discrete Fourier transform on respective sampled data to obtain respective phase changes of the sub-carriers for each symbol and two or more metrics distributed in the frequency domain, extracting the first data from the respective phase changes of the sub-carriers for each symbol, and extracting the second data based on the powers of the two or more metrics.

The above programs may be stored in advance in storage devices fixedly provided in the orthogonal frequency division multiplexed signal generator and the demodulator, or may be supplied being stored into a portable storage medium that can be mounted to and removed from the orthogonal frequency division multiplexed signal generator and the demodulator. Or, they may be supplied through a wired or wireless communication line.

The entire disclosure of Japanese Patent Applications No. 10-084313 filed on Mar. 30, 1998 and No. 10-300399 filed on Oct. 7, 1998 are incorporated herein by reference.

What is claimed is:

1. An orthogonal frequency division multiplexed signal generator for generating a signal that is orthogonal-frequency-division-multiplexed into two or more sub-carriers, comprising:

a data sequence conversion means for arranging first data to be transmitted, in a predetermined order correspondingly to two or more sub-carriers orthogonal to each other on a frequency axis;

a delay means for delaying said first data for a predetermined time to output as second data;

a power changing means for changing powers of said sub-carriers in accordance with said second data;

an inverse discrete Fourier transform means for generating a time-base waveform by synthesizing the two or more sub-carriers changed by said power changing means; and an orthogonal modulation means for performing orthogonal modulation on a real axis signal and an imaginary axis signal which are orthogonal to each other and generated by said inverse discrete Fourier transform means, to synthesize the real axis signal and the imaginary axis signal.

2. The orthogonal frequency division multiplexed signal generator according to claim 1, wherein:

when a minimum unit for transmitting said second data is s bits, said power changing means changes a power spectrum of said sub-carriers according to 2 to the s-th power levels.

3. The orthogonal frequency division multiplexed signal generator according to claim 2, wherein:

when a minimum unit for transmitting said first data assigned to said sub-carriers is p bits, said power conversion means selects said s bits so that s is equal to or more than p, to transmit said second data.

* * * * *